(12) United States Patent
Adair

(10) Patent No.: US 6,527,292 B2
(45) Date of Patent: Mar. 4, 2003

(54) STORABLE TRAILER HITCH

(76) Inventor: Edward C. Adair, 59 Red Fox La., Flagler Beach, FL (US) 32136

( * ) Notice: Subject to any disclaimer, the term of this patent is extended or adjusted under 35 U.S.C. 154(b) by 0 days.

(21) Appl. No.: 09/861,435

(22) Filed: May 21, 2001

(65) Prior Publication Data
US 2002/0171225 A1 Nov. 21, 2002

(51) Int. Cl.⁷ .............................................. B62D 1/155
(52) U.S. Cl. .................... 280/491.3; 280/491.3
(58) Field of Search ........................ 280/491.1, 491.3, 280/491.4, 491.5, 511, 467, 462

(56) References Cited
U.S. PATENT DOCUMENTS

| 4,109,930 | A |   | 8/1978 | Pilhall ........................ 280/491 |
| D258,357 | S | * | 2/1981 | Jackson ..................... D12/162 |
| 4,807,900 | A |   | 2/1989 | Tate .......................... 280/491.3 |
| 5,277,447 | A | * | 1/1994 | Blaser ...................... 280/478.1 |
| 5,288,095 | A |   | 2/1994 | Swindall .................. 280/479.2 |
| 5,725,231 | A | * | 3/1998 | Buie ........................ 280/455.1 |
| 5,727,805 | A |   | 3/1998 | LaRoque ................. 280/478.1 |
| 6,364,337 | B1 | * | 4/2002 | Rowland et al. ......... 280/479.2 |

* cited by examiner

Primary Examiner—Kevin Hurley
(74) Attorney, Agent, or Firm—Robert O. Wright

(57) ABSTRACT

A rugged heavy duty construction for a pivotally mounted hitch receiver that may be pivoted to a stored position from an operating position either alone or without removing a ball mount member inserted therein is shown.

11 Claims, 4 Drawing Sheets

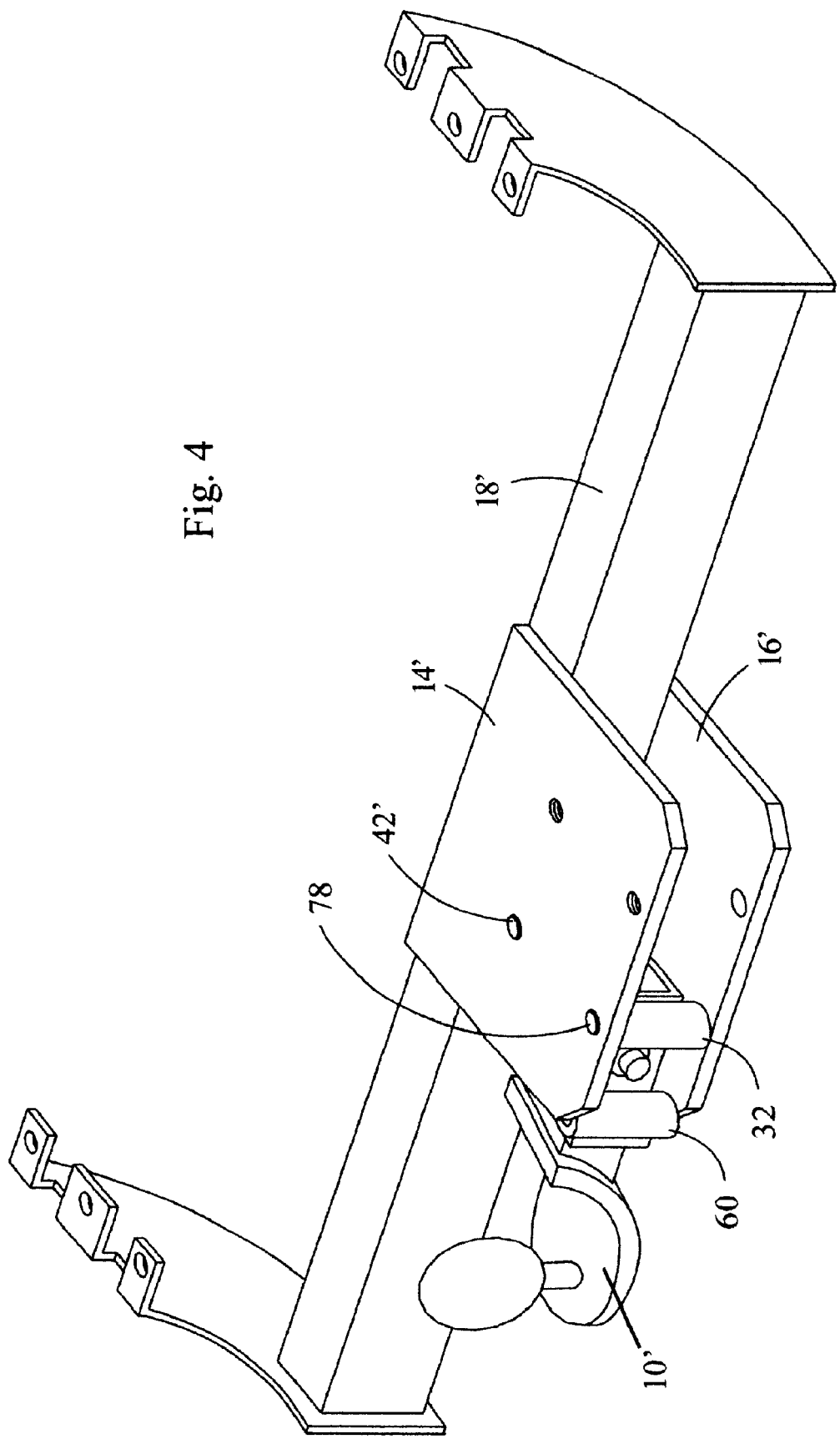

STORABLE TRAILER HITCH

This invention relates to trailer hitches and more particularly to a method and means for pivoting a hitch receiver with a ball mount member mounted therein from towing position to stored position.

BACKGROUND OF INVENTION

Trailer hitches conventionally have been mounted to the frames of vehicles at the rear adjacent the bumper. Typically they have consisted of an elongated hollow hitch receiver mounted on the vehicle and a ball mount member adapted to be selectively inserted into the receiver and secured with the towing ball extending rearward in operative position. With no trailer attached the ball mount has presented a hazard to persons passing the rear of the vehicle and accordingly the ball mount is usually detached when not in use. Once removed the ball mount must be stowed inside the vehicle or risk loss and/or unavailability when needed. When stored in the vehicle the ball mount frequently becomes a deadly missile in the event of an accident.

PRIOR ART

Various attempts have been made to provide a ball mount that can be rotated from a towing position to a retracted position such as shown in U.S. Pat. No. 4,807,900 to Tate in which he provides a horizontal rotatable draw plate carry a ball and U.S. Pat. No. 4,109,930 to Philall which shows a pivotally mounted tow bar 10 which may be pivoted to a retracted position. None of the art has addressed the pivoting of the conventional hitch receiver with or without a removable ball mount mounted therein from an operating extended position to a retracted stored position as shown herein.

OBJECTS AND SUMMARY OF INVENTION

Accordingly it is an object of the present invention to provide a pivotally mounted hitch receiver for standard ball mount tow bars that can be easily moved from towing position to stored position.

It is another object of the present invention to provide a pivotally mounted hitch receiver capable of safely engaging large size tow bars such as class 4, 5, and larger.

It is a further object of the present invention to provide a hitch receiver that may be moved from operating position to stored position with or without a ball mount member fixed therein.

It is a still further object of the present invention to provide hitch receiver that is simple and economical to manufacture, safe and easy to use, and in stowage mode positions a ball mount in a fully retracted position so that it can not be contacted accidentally by a persons legs as they walk behind a vehicle.

These and other and further objects are accomplished in an embodiment of the present invention in which a hitch receiver is hingedly mounted between a pair of horizontal plates for pivotal movement from a rearward facing position to a side facing position.

BRIEF DESCRIPTION OF THE DRAWINGS

FIG. 3 is a view similar to FIG. 1 showing another embodiment of the invention; and.

FIG. 4 is a perspective view of the hitch of FIG. 3 with the hitch receiver and installed ball mount in the stored position.

DESCRIPTION OF A PREFERRED EMBODIMENT

Figure 1:
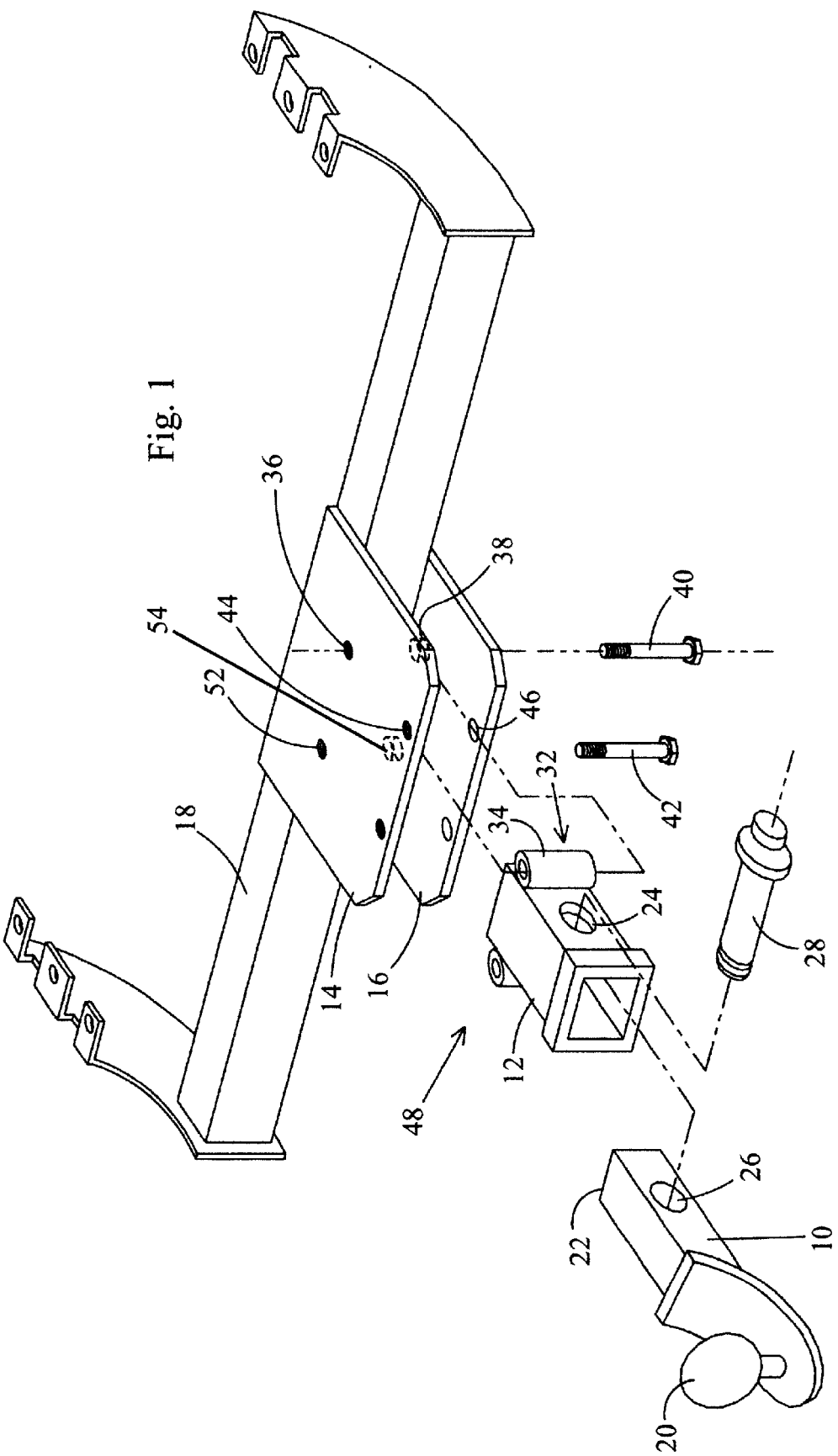
FIG. 1 is an exploded perspective view of a hitch receiver and ball mount member according to the present invention shown in operative position.
Figure 2:
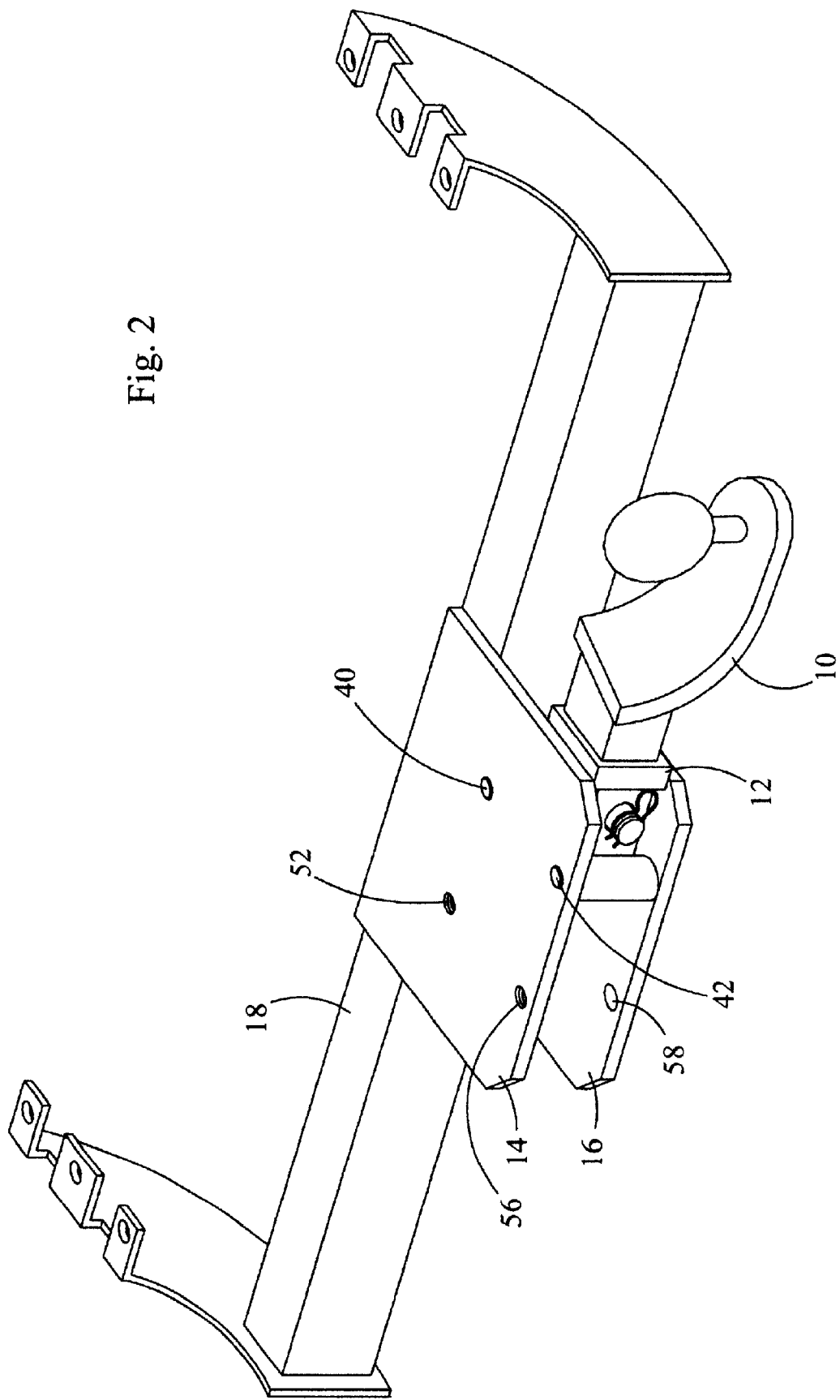
FIG. 2 is a perspective view of the hitch of FIG. 1 with the hitch receiver and installed ball mount in the stowed position.

Referring now to FIG. 1 there is shown an exploded view of a ball mount 10 positioned in a hitch receiver 12 mounted between plates 14 and 16 on a frame member 18 adapted to be installed on the underside of a pickup truck or other vehicle. Ball mount 10 carries the usual hitch ball 20 on its outer end and the distal end 22 of the ball mount is sized to telescopically fit within receiver 12. A pair of transverse holes 24 are provided in the sides of receiver 12 and a corresponding hole 26 is provided in the distal end of ball mount 10. The holes 24 and 26 are position so as to align when the ball mount 10 is in operative position within receiver 12. A linch-pin 28 is inserted through the assembled ball mount and receiver to secure same for towing. A suitable lock (not shown) may be provided to keep linch-pin 28 in proper position FIG. 2 shows the ball mount 10 and hitch receiver 12 pivoted to a non operating retracted position between plates 14 & 16 on frame 18. The receiver and ball mount are shown pivoted to the right in FIG. 2 about hinge assembly 32. Hinge assembly 32 consists of a hinge barrel 34 welded to the side of receiver 12 and a pair of holes 36 & 38 formed in the top and bottom plates 14 & 16 in alignment therewith. The hole 36 in the upper plate is threaded to receive a hinge pin 40 in the form of an Allen head bolt inserted through hole 38 and threaded into hole 36. Pin 42 is inserted through hole 54, the hinge barrel of assembly 48 and into threaded hole 52 to secure the receiver 12 in operative position.

To hold the receiver 12 and ball mount 10 pivoted to the stored position hinge pin 42 is inserted through another pair of holes 44 & 46 in the plates 14 & 16 respectively with hole 44 being threaded again to secure pin 42 in place. Alternatively the receiver 12 and ball mount 10 may be pivoted to the left in FIG. 2 about hinge assembly 48 which includes holes 52 and 54, and pin 42. Pin 40 and holes 56 & 58 are then used to secure the receiver in the pivoted stored position.

Figure 3:
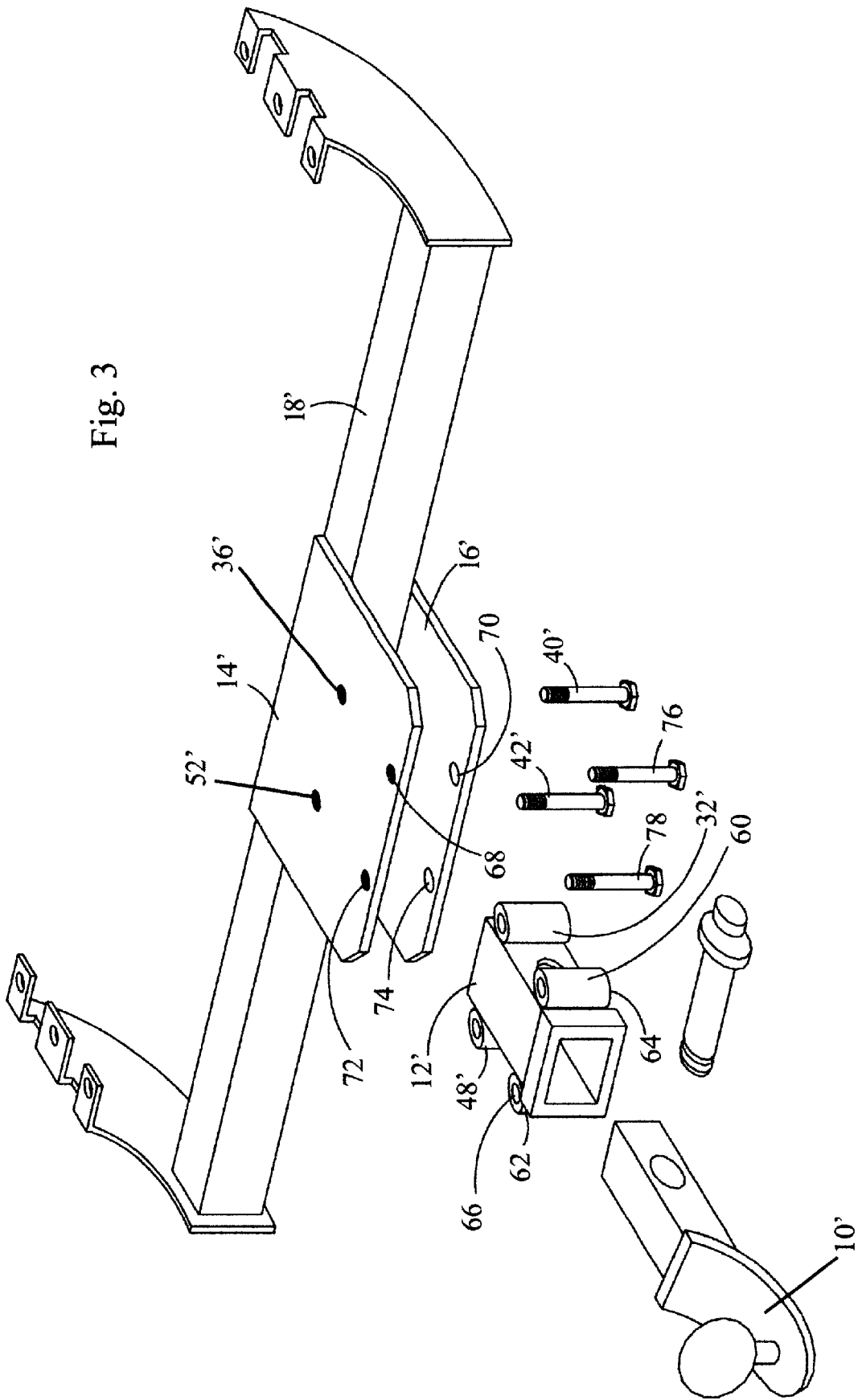

Referring now to FIG. 3 there is shown a heavy duty embodiment in which the two hinge pin assemblies 32 and 48 are supplemented with two additional pin assemblies 60 & 62 to provide greater towing strength for class 5 and larger towing applications. Hinge assemblies 60 & 62 each have barrel portions 64 & 66 welded or otherwise fixed to the forward end of hitch receiver 12'. Corresponding holes 68, 70, 72, & 74 are provided in plates 14' & 16' to permit insertion of hinge pins 76 & 78. As before the holes in upper plate 14' are threaded to receive the threaded ends of pins 76 & 78.

In FIG. 3 the receiver 12' is shown in the towing position. With four pins engaging the receiver 12' extra strength is provided for the towing operation when force is applied to the ball mount member. Also the two front pins 76 & 78 serve to prevent any side to side movement of the hitch receiver 12' during the towing operation.

In FIG. 4 the hitch receiver 12' and ball mount 10' are pivoted to the left about hinge assembly 48 and pin 50. The receiver and ball mount are kept in the stored position by insertion of one of the remaining pins 78 in the front holes 72 and 74 in a manner similar to pin 42 FIG. 2, the remaining pins may be stored by insertion in the open holes left in plates 14' and 16'.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. A trailer hitch ball mount member receiver for mounting on a vehicle comprising:
   a frame member adapted to be mounted on a vehicle;
   a generally hollow hitch receiver adapted to selectively receive herein a ball mount member;
   hinge means fixed to at least one side of said hitch receiver;
   hinge means formed with said frame member to operatively align with said hinge means fixed to said hitch receiver;
   hinge pin means operatively engaged with said hitch receiver and frame member hinge means;
   said frame member and hitch receiver hinge means being positioned on said frame member and hitch receiver to permit rotation of said receiver relative to said frame member so as to retract said receiver, and ball mount member mounted therein, from protruding beyond the outer surface of the vehicle on which said frame member and hitch receiver are to be mounted;
   latching means operatively connected to said hitch receiver and said frame member for selectively securing said hitch receiver in towing position and stored position relative to a vehicle on which said frame member is mounted;
   whereby a ball mount member fixed in said hitch receiver, positioned in the stored position, will not protrude beyond the rear surface of a vehicle so as to be a hazard to the shins of passersby.

2. The invention as claimed in claim 1 wherein said hinge means includes:
   a first member secured to said hitch receiver and having at least one barrel portion;
   a second member secured to said frame member and having at least one barrel portion adapted to align with said first member barrel portion; and
   a hinge pin inserted through said first and second member barrel portions.

3. The invention as claimed in claim 1 wherein said latching means comprises hinge means including:
   a first member secured to said hitch receiver and having at least one barrel portion;
   a second member secured to said frame member and having at least one barrel portion adapted to align with said first member barrel portion; and
   a hinge pin inserted through said first and second member barrel portions.

4. The invention as claimed in claim 1 further including:
   first and second horizontal plate members spaced apart a distance greater than the vertical dimension of said hitch receiver and fixed to said frame member;
   at least one vertical hinge body barrel formed in said hitch receiver to form the first piece of an hinge pair of members;
   a pair of holes, one each formed in said first and second plate members, and positioned in alignment with said vertical hinge body barrel to form the second piece of a hinge pair; and
   a hinge pin positioned in said vertical hinge body barrel and said pair of holes to complete the hinging of said hitch receiver for pivotal movement between said first and second plate members.

5. The invention as claimed in claim 4 wherein said hinge pin is threaded on one end and one of said pair of holes is threaded to receive said threaded end of said hinge pin.

6. The invention as claimed in claim 5 wherein said hinge pin is an Allen head cap screw.

7. The invention as claimed in claim 4 wherein at least two hinge body barrels are formed in said hitch receiver to form the first piece of an hinge pair of members;
   two pairs of holes having one hole each, formed in said first and second plate members, and positioned in alignment with said two vertical hinge body barrels to form the second piece of a hinge pair; and
   a hinge pin positioned in each of said vertical hinge body barrels and said two pair of holes to complete the hinging of said hitch receiver for selective pivotal movement between said first and second plate members about either of said hinge means.

8. The invention as claimed in claim 1 further including:
   hinge means fixed to two opposite sides of said hitch receiver each having a first member secured to said hitch receiver and having at least one barrel portion;
   a second member secured to said frame member and having at least one barrel portion adapted to align with said first member barrel portion; and
   a hinge pin inserted through said first and second member barrel portions.

9. The invention as claimed in claim 5 wherein said hinge means are positioned adjacent the rear end of said hitch receiver; and
   a second pair of hinge means are fixed to the opposite sides of said hitch receiver adjacent the front end of said hitch receiver.

10. The invention as claimed in claim 3 further including:
    a third member secured to said frame member and having at least one barrel portion adapted to align with said first member barrel portion when said hitch receiver is pivoted to the stored position.

11. In a trailer hitch apparatus a ball mount receiving member for selectively positioning a ball mount member in operative and stored positions which comprises:
    a first frame member having upper and lower surfaces adapted to be mounted to the lower rear frame of a towing vehicle;
    a bottom plate fixed to the lower surface of said frame member;
    a top plate fixed to the upper surface of said frame member opposite said bottom plate;
    a hollow hitch receiver member positioned between said bottom and top plates and having an open front end and a back end;
    at least one hinge member formed adjacent said receiver member back end on one side thereof
    a hinge pin fixed in said top plate and said bottom plate and extending through said at least one hinge member;
    whereby said hollow hitch receiver member may be pivoted from an extended towing position to a retracted stored position without removing a ball mount member fixed therein.

* * * * *